(No Model.) 4 Sheets—Sheet 1.

B. F. O'KELLEY & G. W. O'KELLEY, Jr.
COMBINED PEA AND CORN SHELLING MACHINE.

No. 547,737. Patented Oct. 8, 1895.

WITNESSES:
Chas. Nida
J. Fred Acker

INVENTORS
B. F. O'Kelley
G. W. O'Kelley Jr
BY Munn & Co
ATTORNEYS.

(No Model.) 4 Sheets—Sheet 3.

B. F. O'KELLEY & G. W. O'KELLEY, Jr.
COMBINED PEA AND CORN SHELLING MACHINE.

No. 547,737. Patented Oct. 8, 1895.

WITNESSES:

INVENTORS (No Model.) 4 Sheets—Sheet 4.
B. F. O'KELLEY & G. W. O'KELLEY, Jr.
COMBINED PEA AND CORN SHELLING MACHINE.
No. 547,737. Patented Oct. 8, 1895.
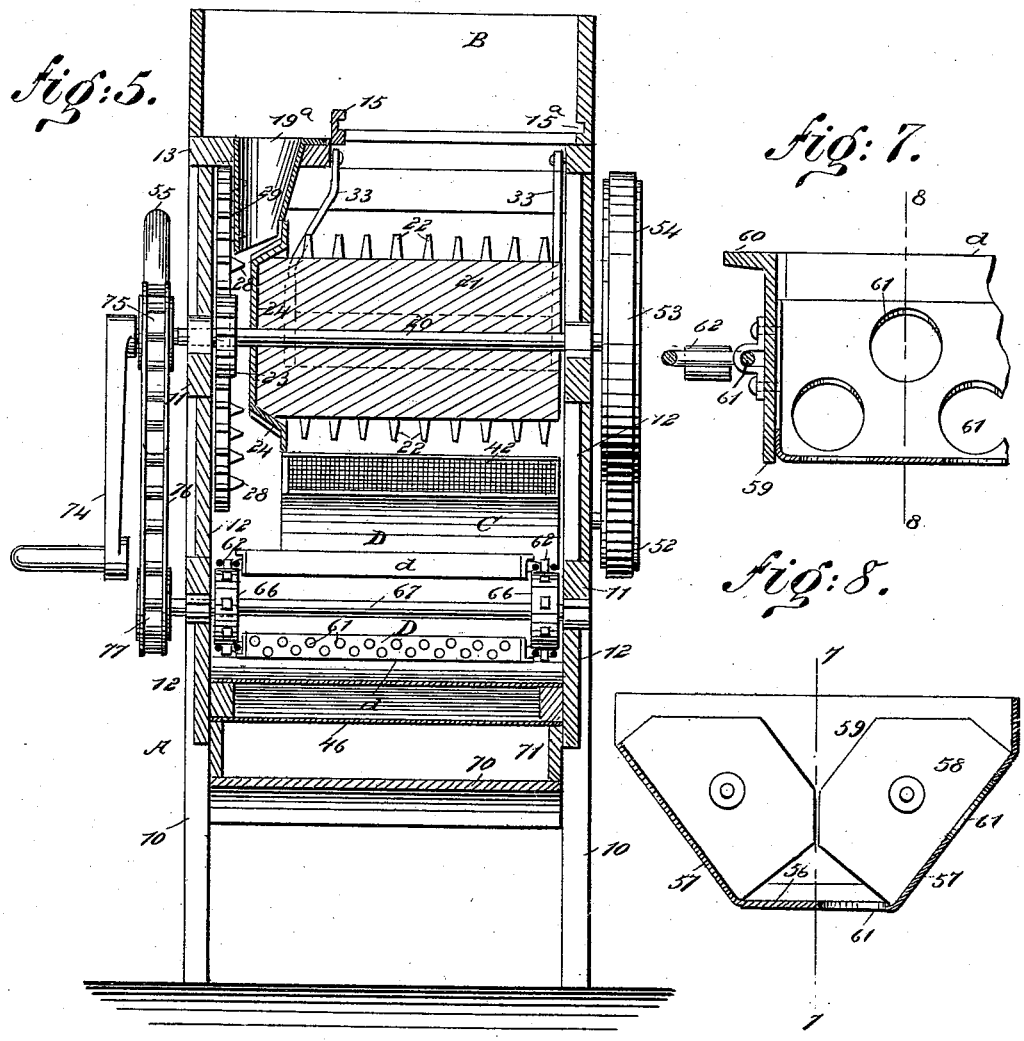
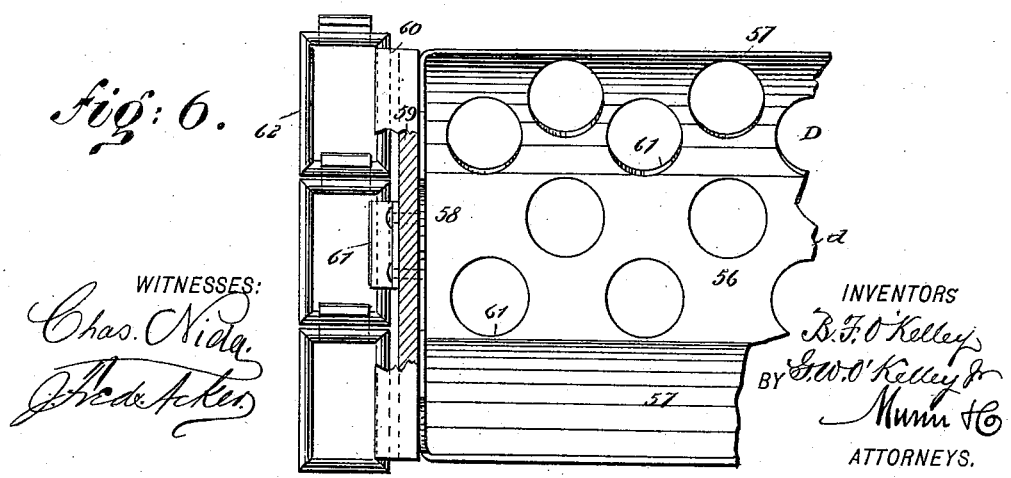

United States Patent Office.

BENJAMIN F. O'KELLEY, OF PLANTER, AND GEORGE W. O'KELLEY, JR., OF HARMONY GROVE, GEORGIA.

COMBINED PEA AND CORN SHELLING MACHINE.

SPECIFICATION forming part of Letters Patent No. 547,737, dated October 8, 1895.

Application filed June 3, 1895. Serial No. 551,544. (No model.)

*To all whom it may concern:*

Be it known that we, BENJAMIN F. O'KELLEY, of Planter, in the county of Madison, and GEORGE W. O'KELLEY, Jr., of Harmony Grove, in the county of Jackson, State of Georgia, have invented a new and Improved Combined Pea and Corn Shelling Machine, of which the following is a full, clear, and exact description.

Our invention relates to a machine which may be interchangeably used for shelling peas or for shelling corn from the cob, the construction being such that when the separation is made the peas or kernels of corn will be subjected to a blast of air which will in a great measure separate them from any foreign matter, and whereby, further, the shelled material will be delivered to an endless or traveling screen so constructed as to carry off the pods or the cobs and permit the peas or the kernels of corn to pass through into a receiving-chute, and whereby just prior to the delivery from said chute the peas and kernels of corn will be subjected to a second blast of air, which will remove any foreign matter that may have escaped the first blast.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the views.

Figure 1:
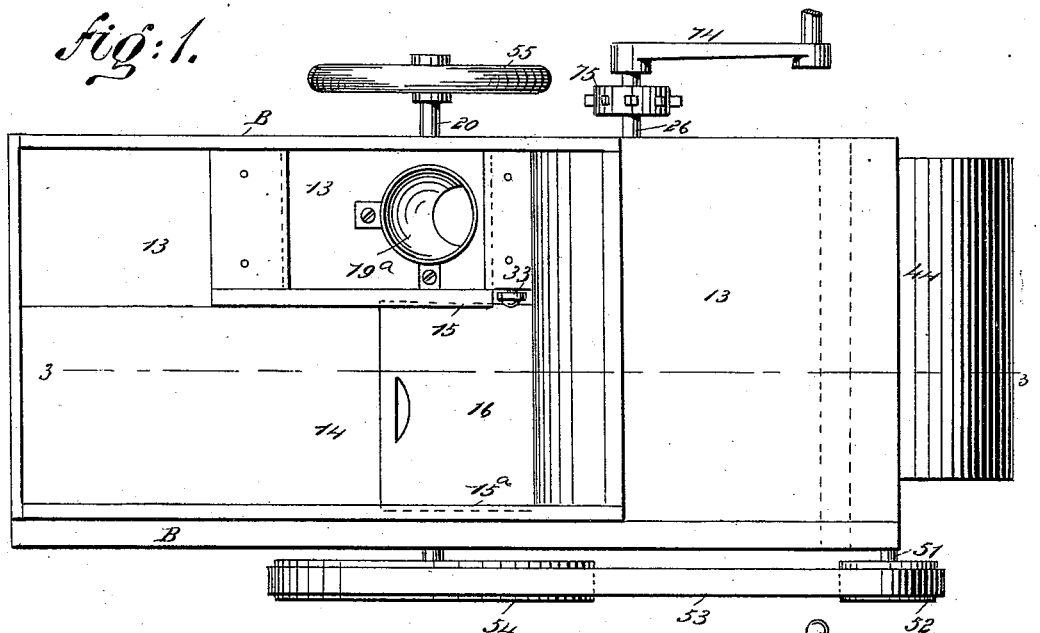
Figure 2:
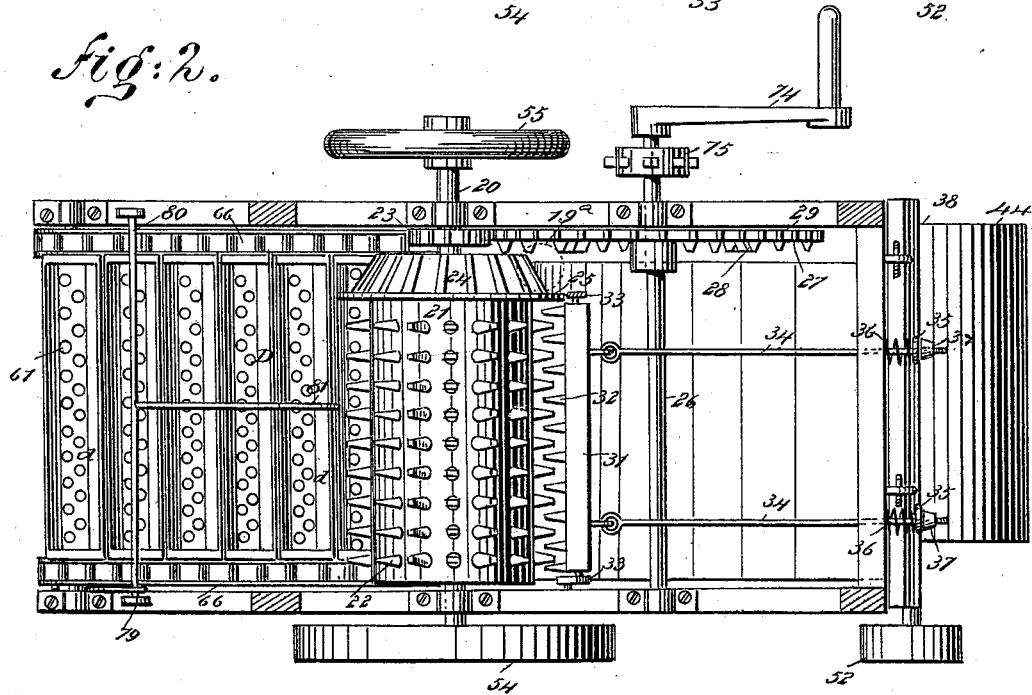
Figure 3:
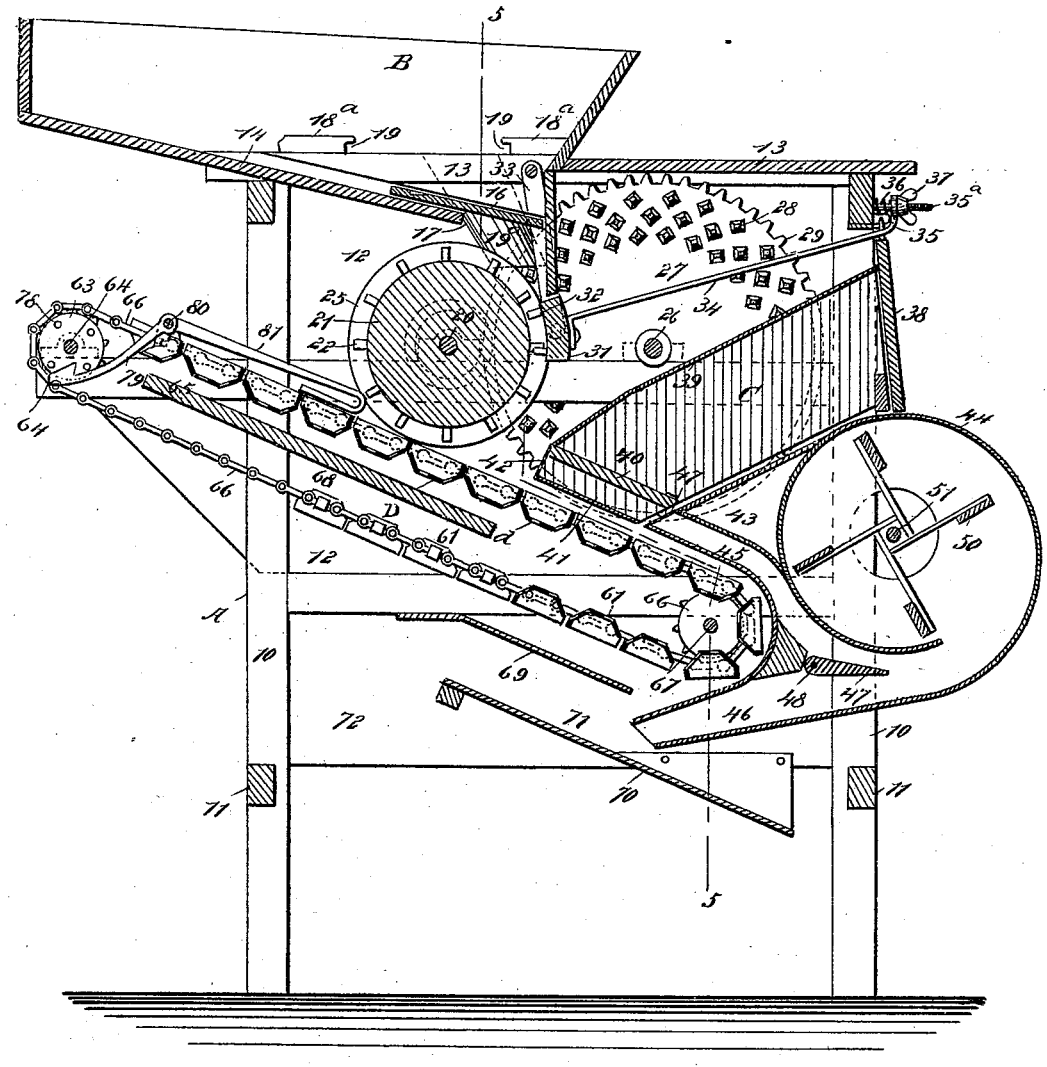
Figure 4:
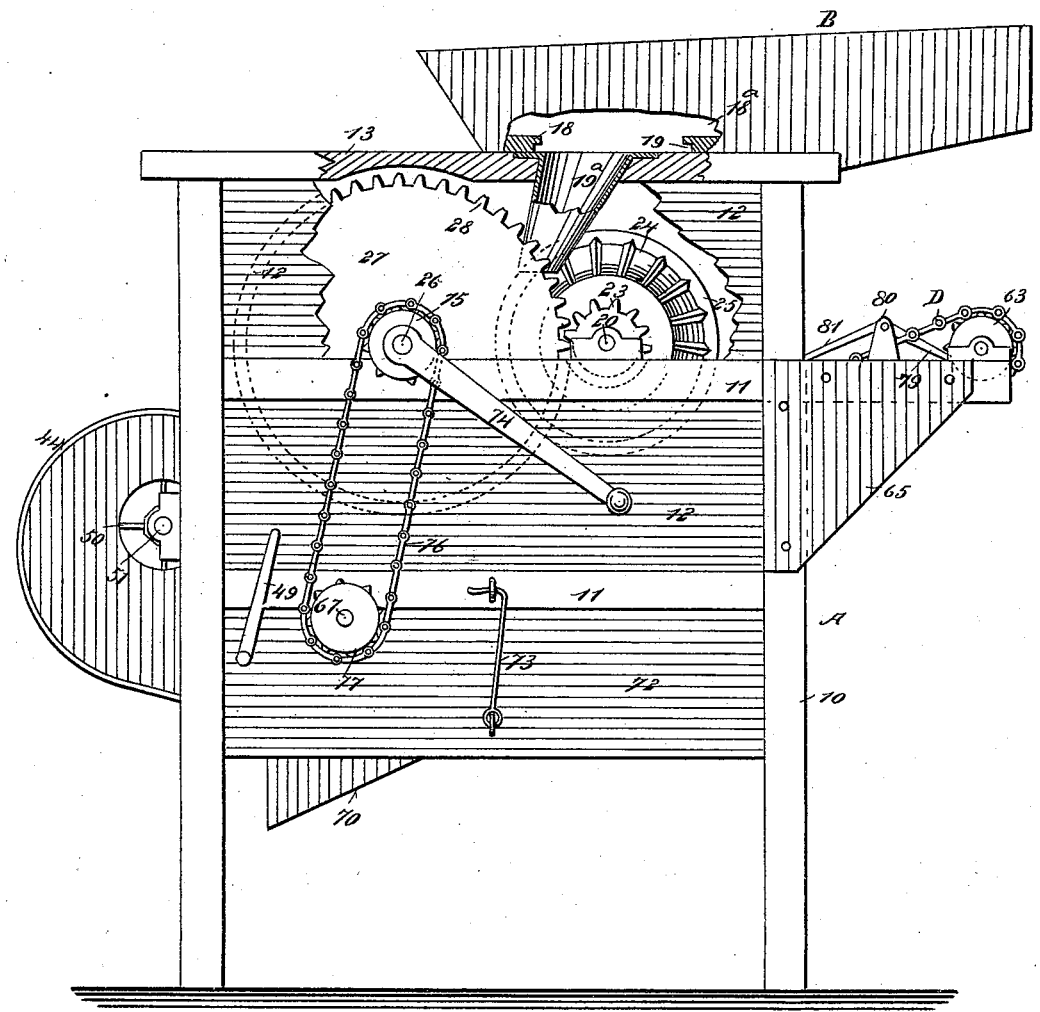

Figure 1 is a plan view of the machine. Fig. 2 is a horizontal section taken just below the top of the machine. Fig. 3 is a vertical longitudinal section taken substantially on the line 3 3 of Fig. 1. Fig. 4 is a side elevation of the machine, a portion of the side being broken away. Fig. 5 is a transverse vertical section taken substantially on the line 5 5 of Fig. 3. Fig. 6 is a plan view of a portion of one of the receiving-troughs of the endless or traveling screen. Fig. 7 is a section through a portion of the said screen, taken substantially on the line 7 7 of Fig. 8; and Fig. 8 is a transverse section through the screen-trough, taken practically on the line 8 8 of Fig. 7.

In carrying out the invention a suitable frame or casing A is employed, usually consisting of uprights 10, cross-bars 11, tying the uprights together, side boards 12, and a top 13, which does not extend entirely over the top of the frame or casing, the latter being exposed at one side near one end. That portion of the top of the frame or casing which is uncovered, together with that portion transversely adjacent thereto, is surrounded by a hopper B, and this hopper at that side which is over the open portion of the top of the casing is provided with a downwardly-inclined floor 14, descending in direction of the center of the frame or casing, as shown in Fig. 3, and at each side of the lower portion of this inclined floor of the hopper slideways are formed, designated, respectively, as 15 and 15$^a$, and shown particularly in Fig. 1, being adapted to receive a sliding door 16, which is intended to cover an opening 17, made in the lower portion of the inclined section of the hopper, as shown in Fig. 3.

Upon the cover of the casing, within the hopper two transverse blocks 18 and 18$^a$ are usually secured, having slideways 19 in their opposing faces, adapted to receive the aforesaid door 16 when it is not employed to cover the opening 17, and a trough 19$^a$, preferably of circular formation and tapering longitudinally, is passed through the cover 13 between the slideways 19 in a downwardly and inwardly direction, as shown in Figs. 3 and 4, the said trough being adapted to receive the ears of corn from which the kernels are to be shelled, while the peas are made to pass through the opening 17 in the hopper when it is uncovered. A shaft 20 is journaled in suitable bearings beneath the opening 17 in the hopper, and upon this shaft a drum or cylinder 21 is secured, being provided with peripheral teeth 22, radiating therefrom, and these teeth are usually and preferably somewhat wedge shape in general contour. The shaft 20 is likewise provided with a pinion 23, securely attached thereto, and facing the pinion at the inner end of the drum or cylinder 21 a flail-wheel 24 is secured to the latter, the said wheel being of a beveled shape and provided with ribs upon its beveled peripheral surface, as shown in Fig. 4, together with a flange 25 at its inner side, which will separate the material passed to the flail-wheel from the material which is to be passed to the teeth of the separating-drum 21. A second or drive shaft 26 is journaled in the frame or casing parallel to the shaft 20, as shown in Fig. 3, and near one end of this shaft a picker-wheel 27 is securely fastened, having projections 28 in the nature of teeth formed upon its inner face, as shown in Fig. 3, these teeth being somewhat tapering and rectangular in cross-section, as shown in the same figure. The teeth of the picker-wheel are adapted to pass an upright in conjunction with the ribs of the flail-wheel 24, the two acting somewhat in the manner of the grinding-wheels of a mill, except that a grinding action is not performed. The picker-wheel is further provided with peripheral teeth 29, which mesh with the pinion 23 on the shaft 20, the picker-wheel receiving movement from the said shaft, and the trough $19^a$, leading from the hopper, is made to enter practically between the separating-surface of the flail-wheel and the side-toothed surface of the picker-wheel, as shown in Figs. 4 and 5, and extends below the revolving flange 25 on the supporting drum or cylinder 21, as is particularly illustrated in Fig. 5.

A breast or concave 31 is located parallel with the drum or cylinder 21, being provided with teeth 32, adapted to extend between the teeth of the said cylinder, the teeth of the cylinder and concave or breast being of like construction, and by reason of their tapering shape they may be placed much closer together than if otherwise formed. The breast or concave is pivoted at its ends to arms 33, which in their turn are pivotally attached to supports upon the upper portion of the frame or casing A, and the breast or concave is adapted to be adjusted to and from the separating drum or cylinder, as may be demanded by the size of the parts and the peas to be shelled, by means of links 34, which are passed through a cross-bar at the rear end of the frame or casing. The outer ends of the links are upturned at 35 and formed with an eye to receive pins or studs $35^a$, seated in the body A. Lock-nuts 37 are secured upon the outer extremities of said studs, which are preferably threaded, and between the lock-nuts and the cross-bar of the frame through which the links are passed the former are encircled by springs 36 or other form of cushion. Thus it will be observed that the springs serve to hold the concave or breast away from the separating-cylinder, and that the breast or concave may be forced and held in somewhat close relation to this cylinder by screwing the nuts 37 in an inwardly direction.

The concave and the separating cylinder or drum 21 are especially adapted for the separation of the peas from their pods, and they are immediately below the opening 17 in the inclined surface of the hopper. The frame or casing is open just below the outer ends of the controlling-links 34 of the concave, being adapted to receive a drawer C or its equivalent, which comprises, preferably, an outer board or plate 38, to which a downwardly and inwardly inclined plate or partition 39 is secured, the latter, when the drawer is in position, closing the opening aforesaid and, as shown in Fig. 3, extending downward to a point below what may be termed the "rear lower portion" of the separating drum or cylinder 21, and at the lower or inner portion of this drawer C a transverse partition 40 is placed parallel with the lower end of the drawer, and the inner end of the space or channel 41 thus made is closed by a screen 42, of any desired mesh. The drawer at its bottom will rest upon a downwardly and inwardly inclined partition 43, which is usually and preferably attached to a fan-casing 44, secured at the rear end of the casing or frame A, the said fan-casing being provided with two outlet-chutes 45 and 46, which are in forked relation to each other, the outlet 45 extending upwardly and forwardly to a connection with the channel 41 in the said drawer C, this outlet being closed by a screen 47 in order that material may not enter the said outlet, which is likewise the cause for providing the screen 42, while the second outlet 46 extends downwardly and forwardly, as illustrated in Fig. 3, and the currents of air generated by the fan may be controlled in their passage to the two outlets through the medium of a valve 47, attached to a shaft 48, mounted in the said casing at the junction of the two outlets, as is also shown in Fig. 3, the valve being controlled by a crank-arm 49 or its equivalent secured to the outer end of the said shaft, as shown in Fig. 4.

The fan 50, located in the fan-casing 44, may be of any approved construction, and the shaft 51, to which the fan is secured, passes out at one side of the casing, being provided with a pulley 52, as illustrated in Fig. 1, and this pulley is driven by means of a belt 53, passed over it and over a balance-wheel 54, which is in the nature of a pulley and is secured to the drum or cylinder-shaft 20, the said shaft being provided with a balance-wheel 55, also at its opposite outer end.

An endless screen-carrier D is provided to remove the pea-pods or the cobs of the corn from the machine, and likewise to provide for the discharge of the kernels of corn or the peas to a suitable delivery-chute. This endless screen-carrier D is composed mainly of a series of separating-troughs $d$, and these troughs are usually made of metal, being provided with a bottom 56, two sides 57, inclined upward and outward from the bottom, and end sections 58, which are attached to an end bar or block 59, provided with an outwardly-extending marginal flange 60, the end blocks or plates 59 being shaped correspondingly in cross-section to the cross-section of the troughs, and the bottom of each trough, together with that side 57 presented to the inner portion of the casing on the upward stretch of the endless carrier, is provided with a series of apertures or openings 61. In fact, the inner sides of the troughs on the upper stretch of the carrier virtually constitute continuations of the bottoms of the troughs. These troughs are connected each with a link of two parallel endless chains 62, as shown in Figs. 6 and 7, the endless chains being made to pass over transversely-aligning sprocket-wheels 63, secured upon a shaft 64, journaled at the upper portion of the forward end of the machine on an extension 65 of its frame, as shown in Fig. 3, and the chains likewise pass over correspondingly-spaced sprocket-wheels 66, secured on a shaft 67, journaled in the frame or casing between the forked outlets 45 and 46 of the fan-casing, passing, therefore, immediately beneath the separating drum or cylinder 21, the drawer C, and the corn-separating mechanisms 24 and 27.

Between the upper and lower stretches of the endless screen-carrier D an inclined apron 68 is secured in the frame or casing, adapted to direct the material which may escape through the uppermost troughs of the said carrier on its upper stretch to the lower portion thereof, and a downwardly and rearwardly extending partition 69 receives this material, delivering it practically on the lower outlet 46 of the fan. In fact, the partition 69, together with a parallel and lower partition 70, extending farther downward and rearward, constitutes a delivery-chute 71 for the shelled material, and this chute is usually formed, or a portion of it, upon detachable side bars 72, located at the bottom of the frame or casing and connected therewith by means of hooks and eyes 73 or their equivalents, in order that ready access may be obtained to the interior of the machine.

If the machine is to be driven by power, a suitable pulley may be placed upon the separating-cylinder shaft 20; but when the machine is to be operated by hand a crank 74 is secured upon one outer end of the drive-shaft 26, which is provided with a sprocket-wheel 75, as shown in Fig. 4, connected by a link-belt 76 with a sprocket-wheel 77, secured upon the lower shaft 67 of the endless screen-carrier. An upper sprocket-wheel 63 of the endless screen-carrier is provided with a series of pins 78, as shown in Fig. 3, and these pins are adapted for successive engagement with the head of a lever-arm 79, as is also shown in Fig. 3, the said lever-arm being connected with a shaft 80, journaled upon the upper portion of the extension 65 of the frame, which shaft the said lever-arm is adapted to rock, and this rock-shaft is provided with either a single knocker-arm 81, adapted to cross several of the screen-troughs on the upper stretch of the endless traveling screen or to strike the said troughs at intervals to insure the passage of the shelled material through the openings in the screen; or two of these knocker-arms may be used, engaging with the flanges at the ends of the screen-troughs.

In the operation of the machine, when peas are to be shelled, the body-trough 19ª is closed and the opening 17 is uncovered. The peas in their pods are placed in the hopper B and fall down between the separating-cylinder 21 and concave 31, and when so passing the pods are separated from the peas. As the peas and pods drop downward upon the endless screen-carrier the air forced by the fan 50 through the upper outlet 45 will blow more or less of the foreign matter from the peas and will hold the peas more or less in suspension, permitting the shelled peas to fall first into the screen-troughs. Therefore they will readily pass through the openings therein, while the pods when entering the said troughs will be carried upward and dumped at the forward end of the machine. As the peas pass through and from the endless screen-carrier to the delivery-trough 71 they will be subjected to a second blast of air from the lower outlet 46 of the fan, being at this point thoroughly separated from extraneous matter. When corn is to be shelled from the cob, the opening 17 is closed and the feed-trough 19ª is opened. The cobs of corn are then fed through this trough, and in passing between the flail-wheel and the picker-wheel the kernels of corn will be separated from the cobs, whereupon the shelled corn and cobs will thereafter be treated in like manner as the shelled peas and their pods.

Having thus described our invention, we claim as new and desire to secure by Letters Patent—

1. In a machine for shelling corn and peas, a separating drum, a flail wheel separated from the said drum, a picker wheel operating in conjunction with the flail wheel, a driving mechanism for imparting rotary motion to the drum the flail and the picker wheels, and an endless screen carrier located beneath the flail wheel and separating drum, as and for the purpose set forth.

2. In a machine for shelling peas and corn, a separating drum, a flail wheel connected with the drum and separated therefrom by an annular partition, a picker wheel acting in conjunction with the flail wheel, a driving mechanism for the flail wheel, picker wheel and separating drum, a screen or sieve conveyer located beneath the drum and flail wheel, and hoppers leading to the drum and flail wheel, the hoppers being independent, as and for the purpose set forth.

3. In a machine for shelling peas and corn, a separating drum, a flail wheel connected with the drum and separated therefrom by an annular partition, a picker wheel acting in conjunction with the flail wheel, a driving mechanism for the flail wheel, a picker wheel and separating drum, a screen or sieve conveyer located beneath the drum and flail wheel; hoppers leading to the drum and flail wheel, the hoppers being independent, an interchangeable cover for the two hoppers, and knockers operating upon the conveyer, as and for the purpose set forth.

4. In a corn and pea sheller, a separating drum, a flail wheel connected with the said drum and separated therefrom by an annular partition, a picker wheel operating in conjunction with the flail wheel, hoppers located one over the drum and the other over the flail wheel and independently operated, a driving mechanism for the two shelling mechanisms, a screen or sieve carrier located beneath the flail wheel and drum, and a fan provided with branched outlets, one of which is directed above and the other below the said carrier, as and for the purpose set forth.

5. In a machine for shelling peas and corn, a toothed separating drum, an adjustable concave or breast likewise toothed and operating in conjunction with the said drum, a hopper located over the drum, and a screen or sieve conveyer located beneath the said drum and concave, and a fan having outlets, leading one above and the other below the said conveyer, as and for the purpose specified.

6. In a machine for shelling peas and corn, a separating drum, a breast or concave acting in conjunction with the said drum, a screen or sieve conveyer, consisting of a series of apertured troughs and chains carrying the same, the conveyer being located beneath the concave and the drum, an inclined partition leading downward to the conveyer at the rear of the drum and the concave, and a fan provided with outlets, leading one above and the other below the conveyer, the lower outlet leading also into the outlet chute for the machine, and the upper outlet extending to the lower delivery point of the concave and drum, as and for the purpose specified.

7. In a machine for shelling peas and corn, a separating drum, a breast or concave acting in conjunction with the said drum, a screen or sieve conveyer, consisting of a series of apertured troughs and chains carrying the same, the conveyer being located beneath the concave and the drum, an inclined partition leading downward to the conveyer at the rear of the drum and the concave, a fan provided with outlets, leading one above and the other below the conveyer, the lower outlet leading also into the outlet chute for the machine, the upper outlet extending to the lower delivery point of the concave and drum, means, substantially as described, for regulating the currents of air to the two outlets of the fan, means for adjusting the concave, and a hopper located over the separating drum, as and for the purpose specified.

8. In a machine for shelling peas and corn, or like articles, a flail wheel, a picker wheel operating in conjunction with the flail wheel, a screen or sieve conveyer or carrier located beneath the flail wheel, composed of side chains and troughs connecting the said chains, provided with openings in the bottom and sides, a fan having two outlets, one above the conveyer or carrier and the other below the same, a hopper leading to the space between the picker and flail wheels, and means, substantially as shown and described for directing the shelled material to the conveyer or carrier, as and for the purpose specified.

9. In a machine for shelling corn, peas and like articles, a double hopper having independent openings, a flail and a picker wheel located beneath one of the said openings of the hopper, a separating drum located beneath the second opening, a breast or concave operating in conjunction with the said drum, a screen or sieve carrier or conveyer located beneath the flail wheel, the drum and the concave, having a receiving surface composed essentially of series of perforated troughs, interchangeable guide surfaces adapted to direct the shelled material to the conveyer, a fan having two outlets, one above and the other below the conveyer or carrier, and means, substantially as shown and described, for agitating the carrier or conveyer, as and for the purpose specified.

BENJAMIN F. O'KELLEY.
GEORGE W. O'KELLEY, JR.

Witnesses:
L. G. BROOKS,
STEPHEN C. O'KELLEY.